Nov. 10, 1959 　　J. E. G. EURICH　　2,912,604
MINIATURE ELECTRIC MOTOR FOR TOYS
Filed March 15, 1957
FIG.1
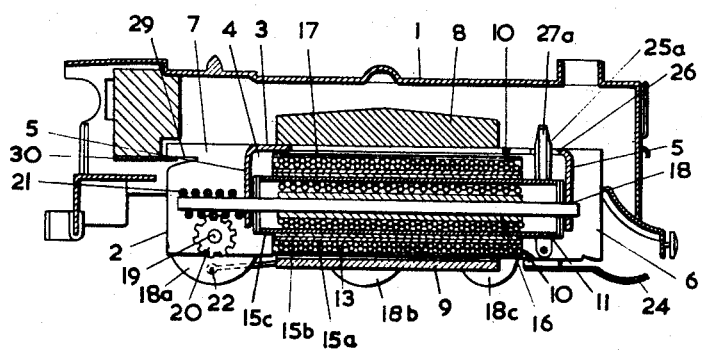
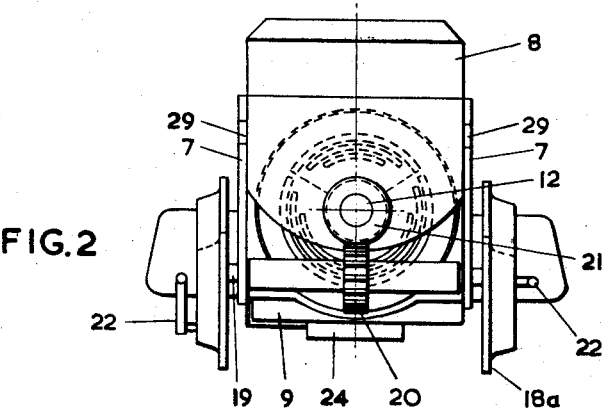
FIG.2
FIG.3
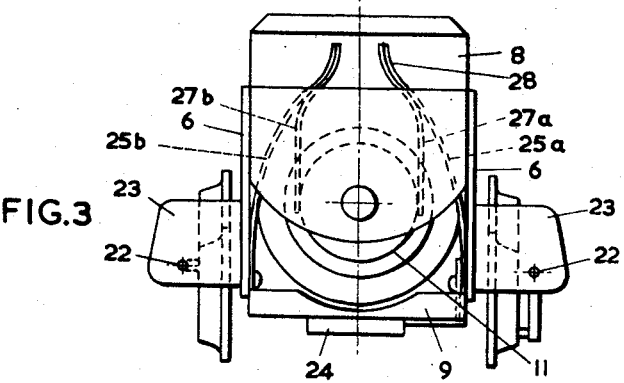
INVENTOR
Joe E. G. Eurich
ATTORNEYS United States Patent Office 2,912,604
Patented Nov. 10, 1959

2,912,604

MINIATURE ELECTRIC MOTOR FOR TOYS

Joe Emil George Eurich, Little Brington, England, assignor to The Mettoy Company Limited, London, England, a British company Application March 15, 1957, Serial No. 646,274

Claims priority, application Great Britain March 19, 1956

5 Claims. (Cl. 310—1)

This invention relates to electric motors, and also has reference to articles such as machines or vehicles incorporating electric motors and driven thereby. More particularly, the invention is concerned with miniature electric motors of the kind most suitable for use in toy vehicles, but which can be used with advantage in any machine or device where small size and compactness of the motor is of primary importance.

It is an object of the invention to provide a miniature electric motor of inexpensive construction and very compact size.

According to the invention there is provided a miniature electric motor the stator of which comprises permanent magnet means and the rotor of which comprises at least three armature windings rotatably mounted about an axis parallel to the magnetic axis of said magnet means, the magnetic axis of each of said armature windings being parallel to said magnetic axis of said magnet means and commutator and brush means being provided for energising said armature winding means with an actuating current.

According to the invention there is also provided a miniature electric motor having permanent magnet stator means and rotor means mounted with its axis of rotation parallel to the magnetic axis of said stator means, said rotor means comprising a shaft and at least three armature windings grouped around the shaft and secured thereto, said armature windings being arranged parallel to the shaft and also parallel to the magnetic axis of said stator means, commutator and brush means being provided for energising said armature windings with an actuating current.

The invention further provides a miniature electric motor the stator of which comprises permanent bar magnet means and the rotor of which comprises a shaft, rotatably mounted parallel to the magnetic axis of said magnet means, having at least three armature windings grouped around the shaft and secured thereto, each of said armature windings being of substantially the same length as said magnet means and being arranged parallel to said shaft commutator and brush means being provided for energising said armature windings with an actuating current.

There is still further provided according to the invention a miniature electric motor the stator of which comprises permanent bar magnet means and the rotor of which comprises three armature windings assembled around a shaft whose axis of rotation is parallel to the magnetic axis of said bar magnet means, said armature windings each consisting of insulated wire wound about a core which comprises at least three laminae, each of said armature windings being substantially equal to the length of said bar magnet means and the magnetic axis of each of said armature windings being parallel with the magnetic axis of said bar magnet means, commutator and brush means being provided for energising said armature windings with an actuating current.

The invention also provides a model electric locomotive incorporating a miniature electric motor having permanent magnet stator means and rotor means mounted with its axis of rotation parallel to the magnetic axis of said stator means, said rotor means comprising a shaft and at least three armature windings grouped around the shaft and secured thereto, said armature windings being arranged parallel to the shaft and also parallel to the magnetic axis of said stator means, commutator and brush means being provided for energising said armature windings with an actuating current, said electric motor being mounted in a chassis also carrying the running wheels of the locomotive and being held in the body of the locomotive by means of cut outs provided in one end of the chassis and adapted to engage a shelf provided in said body, the other end of said chassis making a push fit into said body.

Further features and advantages of the invention will be apparent from the following description of a miniature electric motor constructed in accordance with the invention, and suitable for incorporating in a toy locomotive, it being understood that this description is intended purely by way of example, reference being made to the accompanying drawings in which:

Figure 1 is a longitudinal sectional view of an electric motor according to the invention taken along the center of the line thereof, with a locomotive body shown in outline;

Figure 2 is a rear view of the electric motor, and

Figure 3 is a front view of the electric motor.

Referring to the drawings a model locomotive incorporating an electric motor according to the invention conviently comprises two principal parts, a substantially hollow body 1 open on its underside, and a wheeled chassis 2 which carries an electric motor constructed in accordance with the invention.

The chassis 2 is formed from a sheet metal blank which is cut and bent to provide a top 3, two side walls 4, and two end walls 5, the sides projecting forwardly and rearwardly beyond the end walls 5 to provide front and rear fins 6 and 7 respectively. Secured to the top of the chassis and extending longitudinally along it is a permanent bar magnet 8 having a pole at each end, this magnet forming the stator of the motor. A similar permanent bar magnet 9 is secured beneath the chassis between the two side walls 4. These two magnets 8 and 9 form the stator of the motor.

The rotor comprises three armature windings or coils 10, a commutator 11, and a shaft 12 constructed, arranged and secured together as follows. Each armature winding consists of insulated wire 13 wound about a core which comprises at least three laminae (15a, 15b and 15c as shown in the drawing) two (15a and 15b) or more of iron or other magnetisable material and one (15c) of brass. These laminae are of arcuate section and are superimposed, the width of the middle lamina being intermediate that of the other two and the brass lamina being disposed on the inside. The brass lamina projects beyond one end of the assembly of each armature winding to form one sector of the commutator 11. The three armature windings 10 are assembled in edge to edge relationship closely around the shaft 12 which carries a sleeve 16 of electrical insulating material (conveniently a resilient synthetic resin) the longitudinal axes of the coils being parallel to that of the shaft. The assembly is held tightly together (that is tight enough to ensure a frictional drive relationship between the coils and the shaft) by means of an external wrapping 17 of adhesive tape. Whilst this securing means is sufficiently effective, it will be appreciated that other means may be employed if desired, an epoxy-resin casting for example, or any suitable moulding of synthetic resin material. One end of the coiled wire of each armature winding is electrically connected to its brass commutator sector, whilst the other ends are connected together thus forming a star connection for the rotor, but a delta connection may be used if desired.

The ends of the shaft project from the ends of the armature windings, and are rotatably supported in the end walls 5 of the chassis, as shown at 18 the axis of the shaft (which is the axis of rotation of the rotor) being disposed parallel to the magnetic axis of the permanent magnets 8 and 9.

Mounted in the side walls 4 of the chassis at intervals along its length are three pairs of metal flanged wheels 18a, 18b and 18c the rear pair 18a being cast on an axle 19 passing transversely through the rear fins 7 of the chassis 2, the axle having secured to it a gear wheel 20 which is meshed with a worm 21 on the projecting rear end of the driving shaft. Pivoted eccentrically to each rear wheel is a pin 22 which extends forwards, its front end being slidably received in an imitation cylinder 23 in the form of a block secured to each side wall 4 of the chassis; these pins 22 thus serve to simulate the piston rods of a full size locomotive.

The particular toy being described is intended to run on a three rail track, the centre one of which is live. Accordingly the chassis 2 carries at its front end a spring conductor shoe 24 adapted to contact the live rail. This shoe is electrically connected with a metal supporting arm 25a which is secured to but insulated from the inner suface of one of the chassis side walls 4. This arm 25a extends upwardly through a gap 26 in the top of the chassis to a point above the level of the chassis and has secured to its upper end a depending spring metal strip or brush 27a which is pressed against the brass commutator 11. A similar metal supporting arm 25b electrically connected to the other side wall 4 of the chassis also carries a depending metal strip or brush 27b which is in contact with the commutator 11. The two brushes are arranged to contact the commutator at points 180° apart, so that whilst one sector of the commutator is in contact with one brush, its neighbour will be in contact with the other brush. The upper ends 28 of the supporting arms 25a and 25b are bent outwards to increase the pressure of the brushes on the commutator.

The mode of operation of the electric motor will now be apparent. Current can be made to flow either through the shoe 24 and brush 27a through the armature windings thence through the other brush 27b, the chassis and wheels back to earth, or in the reverse direction. The armature windings, thus energised, will be either attracted towards or repelled from the permanent magnets depending upon the direction of flow of the applied current, the motor being accordingly reversible.

The chassis and motor can readily be inserted into and removed from the body of the locomotive. For this purpose the rear fins 7 have horizontal V-shaped cut outs 29 in their rear (vertical) edges to provide tongues which engage above a shelf 30 extending transversely across the rear end of the hollow body, whilst the front end of the chassis is a push fit in the body. Removal of the chassis is effected by simply pulling on the cylinders 23 at its front end. No screws or other extraneous securing means are required.

The toy is of extremely small size, the chassis length being of the order of 1¾ ins., whilst the body is only approximately 2½ ins. long. Its overall height is approx. ¾ in. and the wheel gauge is ½ in. The design and longitudinal arrangement of the motor renders the locomotive at once neat, compact, robust and economical in manufacture.

Although the construction described above is preferred, it will be obvious to those skilled in the art that many modifications are possible within the scope of the invention. For example one permanent magnet may be employed if desired, situated above or below the rotor. Moreover, the locomotive can be adapted to run on a two rail track, the shoe being then of course not required, and the wheels being insulated. It will be appreciated that the motor of the invention has many applications other than that described.

I claim:

1. A miniature electric motor comprising a support, a shaft journalled in said support, at least three elongated metallic cores of arcuate cross section disposed parallel to said shaft and equally spaced around it, a coil of insulated wire wound around each of said cores and having one end electrically connected thereto and its other end connected to an end of adjacent coil, one end of each core projecting beyond the respective coil and forming with the other core ends a commutator for said motor, means securing said coils and cores to said shaft with said coils fitting closely against the shaft and against one another, a pair of brushes carried by the support and wiping the projecting ends of the cores and a permanent bar magnet secured to the support with its axis parallel to the shaft.

2. A miniature electric motor as defined in claim 1 wherein each of said cores comprises a strip of copper base metal and at least one strip of ferrous metal disposed further from the shaft than the copper base strip, the end of said copper base strip only projecting beyond said coil for engagement by said brushes.

3. A miniature electric motor the stator of which comprises permanent bar magnet means and the rotor of which comprises three separate armature windings assembled around a shaft, the axis of rotation of said shaft and the magnetic axes of said windings being parallel to the magnetic axis of said bar magnet means, said armature windings each consisting of a coil of insulated wire wound about a core having an arcuate cross-section and comprising at least three laminae, at least two of the laminae of each core being of iron and one of brass, with one end of each brass lamina projecting beyond the end of its coil, one end of each coil being connected to the brass lamination in the core about which it is wound and its other end being connected to an end of an adjacent coil, said projecting brass ends forming together a commutator for said rotor, and brush means positioned to wipe said commutator.

4. A motor as claimed in claim 3 in which said brass laminae are on the inside nearest the shaft.

5. A motor as claimed in claim 3, in which the three windings are assembled in edge to edge relationship closely around said shaft which carries a sleeve of electrical insulating material.

References Cited in the file of this patent

UNITED STATES PATENTS

| | | |
|---|---|---|
| 1,835,721 | Powell | Dec. 8, 1931 |
| 1,857,209 | Moore | May 10, 1932 |
| 2,235,151 | Gillen | Mar. 18, 1941 |
| 2,279,690 | Lindsey | Apr. 14, 1942 |
| 2,404,331 | Werner | July 16, 1946 |
| 2,632,284 | McDonald | Mar. 24, 1953 |
| 2,659,317 | Bonanno | Nov. 17, 1953 |
| 2,791,704 | Kiralfy | May 7, 1957 |